United States Patent

[11] 3,589,489

[72] Inventor Herbert Fehlings
 Wiesbaden, Germany
[21] Appl. No. 820,605
[22] Filed Apr. 30, 1969
[45] Patented June 29, 1971
[73] Assignee Pressluftwerkzeug und Maschinenbau PREMAG G.m.b.H.
 Geisenheim/Rhine, Germany
[32] Priority May 2, 1968
[33] Germany
[31] P 17 03 316.8

[54] DRIVE FOR NUT RUNNERS WITH AUTOMATIC STOP
 11 Claims, 3 Drawing Figs.
[52] U.S. Cl. ................................................ 192/139,
 74/812, 81/57.3, 192/142
[51] Int. Cl. ........................................... F16d 71/00,
 F16h 5/72, B25b 17/02
[50] Field of Search ........................................... 74/812;
 173/12; 81/57.11, 57.31; 192/139, 142

[56] References Cited
UNITED STATES PATENTS

| 2,395,636 | 2/1946 | Mettert | 74/812 |
|---|---|---|---|
| 2,467,627 | 4/1949 | Olson | 74/812 X |
| 2,583,823 | 1/1952 | Dunham | 74/812 X |
| 3,319,494 | 5/1967 | Ulbing | 74/812 |
| 3,454,111 | 7/1969 | Niess | 192/142 X |

Primary Examiner—Carlton R. Croyle
Assistant Examiner—Thomas C. Perry
Attorney—Stephen J. Rudy ABSTRACT: A nut runner adapted to run a threaded fastener into engagement with a workpiece, and then to tighten it to a final torque, determined by the angle through which the fastener is rotated. The nut runner comprises a reversible motor driving a driving shaft section. During rotation of the driving shaft section in a forward direction, it is directly connected through first releasable locking means with a driven shaft section driving the tool. When an initial torque is reached, the motor is reversed and the first releasable locking means released. Drive to the driven shaft section is continued via sun-and-planet gearing, the tubular sun gear of which carries an adjustable stop which engages with a stationary stop after predetermined angular displacement to thereby terminate the process.

DRIVE FOR NUT RUNNERS WITH AUTOMATIC STOP

This invention relates to nut runner for moving rotatable fastening elements, consisting of a reversible driving motor and housing which carries a shaft and accommodates a tool and is connected with the driving motor.

Pneumatically driven nut runners for tightening screw connections are known and function in accordance with the so-called torque control for applying a requisite tension load to a threaded fastener. A threaded fastener is tightened in two stages. In the first stage, the nut is run down by the tool until it contacts the surface of the workpiece whilst the second stage provides the tension load. While the nut is being brought into contact with a surface, the force and hence torque requirements at the driving motor of the nut runner are small but they increase several times during the actual tightening stage.

It is known to be a considerable deficiency that close-tolerance tension loads cannot be adhered to with conventional nut runners. In the mass production this is due to the fact that during tightening even minimal variations in the torque output of the motor result in considerable errors in the tension load. Neither is it possible with conventional nut runners to increase the tightening torque producing the tension load a residual tightening torque which compensates a higher friction factor of the threaded fastener. Errors arising both out of the screw and in many cases out of the workpiece cannot be corrected by conventional nut runners for producing a close-tolerance tension load in mass production, so that hitherto they have not been satisfactory in operation with regard to critical threaded fastener assemblies.

In the manufacture of large engines and turbines, the tension load is not generated with the tightening torque as criterion but with the angle of rotation as criterion. In this case, the angle of rotation is continuously measured until it reaches a predetermined value. Unfortunately, this embodiment which is called rotation control process is not suitable for automatic operation in mass production.

Starting from nut runners of the kind referred to above, the object of the invention is to provide a nut runner which obviates the aforementioned disadvantages and enables the rotation control process to be economically applied in mass production.

According to the invention this object is achieved by reversible drive motor and a housing mounted to said motor; a driving shaft section rotatably supported within said housing, and adapted to be driven from said motor in forward and reverse directions, a driven shaft section rotatably supported within said housing and drivably connected with a work engaging tool; coupling means for driving said driven shaft section from said driving shaft section in one direction during rotation of the driving shaft section in both said forward and reverse directions, and rotation limiting means, adapted to terminate rotation of the driven shaft after a predetermined angular movement of said driven shaft in said reverse direction.

It is a preferred embodiment wherein said rotation limiting means comprises rotary stop means adapted to be rotated during said reverse rotation and to cooperate with counterstop means fast with said housing.

One embodiment of the invention is shown in the drawings and is described in detail in the following:

Figure 1:
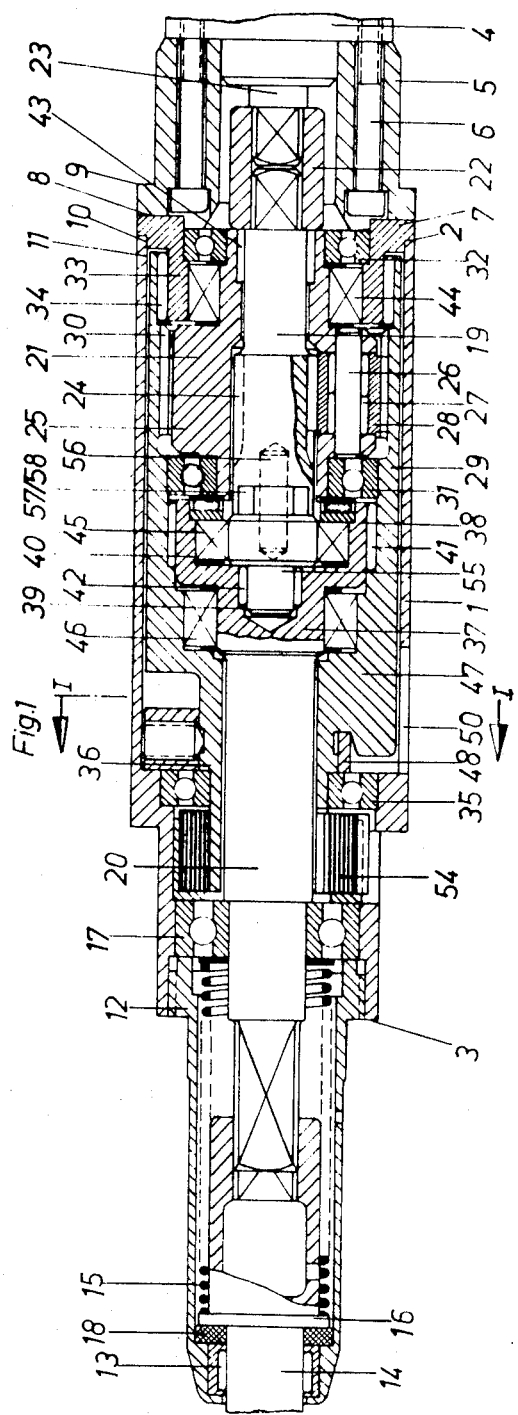
FIG. 1 is a longitudinal section through the nut runner.

The nut runner consists of a tubular housing 1 with a driving end. The reversible power-vane motor 4 is connected to the driving end 2 of the tubular housing 1 through a bushing 5 which in turn is connected to the motor through screws 6 and to the tubular housing 1 through fastening means (not shown). Arranged between the driving end 2 of the housing 1 and the bushing 5 there is a stepped bushing 7 whose outer end face 8 situated near the driving end rests against a shoulder 9 of the bushing 5. A first step 10 of the stepped bushing 7 rests on the inner periphery 11 of the tubular housing 1. The radially extending portion of the first step 10 of the stepped bushing 7 prevents the stepped bushing 7 from moving axially inwards into the interior of the tubular housing 1. Screwed into the driven spindle side 3 of the tubular housing 1 there is a sleeve 12 which at its front end surrounds a needle bearing 13 for mounting a tool supporting shaft 14. The tool supporting shaft 14 is so accommodated in the housing 12 as to be axially displaceable therein, being braced by a spring 15. The spring 15 is arranged between a shoulder 16 on the tool mounting shaft 14 and the inner ring of a ball bearing 17 which is accommodated in the tubular housing 1. The movement of the tool mounting shaft 14, directed axially outwards, is limited by the shoulder 16 and a stop ring 18 which is arranged between the shoulder 16 and the needle bearing 13, whilst the inward movement of the shaft 14 is governed by the pitch of the spring 15. Two shaft sections, namely a driving shaft section 19 and a driven shaft section 20, are accommodated in the tubular housing 1 in such a way that they rotate independently of one another. The driving shaft section 19 and the driven shaft section 20 are directly and indirectly joined together through a gear 21 arranged coaxially in the housing 1. The driving shaft section 19 is directly connected to the driving shaft 23 of the motor 4 through a rigid coupling 22 inside the bushing 5. At its center, the driving shaft 19 is provided with teeth 24 in the form of a pinion. The driving shaft section is rotatably mounted in a planet gear cage which carries a planet gear 28 meshing with the pinion 24 by way of a shaft 26 and a needle bearing 27. A tubular orbit gear 29 is rotatably mounted in the housing 1 and around its inner periphery at a point adjacent the planet gear 28 comprises inner teeth 30 with which the planet gear 28 meshes so that the driving shaft section 19 is in form-locking engagement with the orbit gear 29 through the planet gear 28. The planet gear cage is supported around the inner periphery of the orbit gear through a ball bearing 31 and around the inner periphery of the stepped bushing 7 by a ball bearing 32. On a second step 33 smaller in diameter than the first step 10 the stepped bushing 7 carries a needle bearing 34 over which engages the outer open end of the orbit gear directed towards the driving end 2 of the tubular housing 1 so that the orbit gear 29 is rotatably mounted on the one hand through the needle bearing 34 and on the other hand through a ball bearing 35 arranged near the driving end 3 between a recess 36 in the orbit gear 29 and the inner periphery 11 of the tubular housing 1. The orbit gear 29 is thus supported on the inner periphery 11 of the tubular housing 1 and on the outer periphery of the second step 33 of the stepped bushing 7.

At its front end accommodated in the sleeve 12, the driven shaft section 20 is designed in such a way that it can engage positively in the tool mounting shaft 14. The rear end of the driven shaft 20 situated within the orbit gear 29 is provided with two steps and comprises two coaxially arranged bores 39 and 40, the bore 40 being countersunk. A needle bearing 41 is arranged between the outer periphery of the step 38 and the inner periphery of the tubular orbit gear 29. Near the driven spindle end 3 of the tubular housing 1 a ball bearing 17 is let into the tubular housing 1, rotatably supporting the driven shaft 20 in conjunction with the needle bearing 41. A needle bearing 42 is let into the bore 39 of the driven shaft section 20. Near the rigid coupling 22, along the periphery of the bore through which the pinion 24 passes, the planet gear cage also carries a needle bearing 43 so that the driving shaft section 19 is rotatably mounted in alignment with the driven shaft section 20 and the planet gear cage 25. Near the ball bearing 32 the planet gear cage 25 carries a locking mechanism 44 in the form of a one way or overrunning brake at its ends nearest the driving side between its outer periphery and the inner periphery of the stepped bushing 7. A second locking mechanism 45 acting as a overrunning clutch is arranged between the inner surface of the countersunk axial bore 40 in the step 38 of the driven shaft section 20 and the outer surface of the driving shaft section 19. There is a third locking mechanism 46 between a corresponding section situated inside the tubular orbit gear 29 and the outer periphery of the step 37 of the driven shaft section 20.

A stop device is arranged in the recess 36 in the orbit gear 29 towards the driven spindle end of the tubular housing 1. This stop device consists of two parts. A stop cam 47 is fixedly and immovably connected with the orbit gear. In the embodiment under discussion the fixed stop cam 47 has been milled out of the wall of the tubular orbit gear 29. In front of this fixed stop cam there is an adjustable stop cam 48 which is so mounted as to rotate around the periphery of the recess 36. Axial movement of the rotatable stop cam 48 is prevented by a corresponding eccentric relief in the fixed stop cam 47 in conjunction with the ball bearing 35. Arranged radially to the driven shaft 20 in the movable stop cam 48 there is an adjusting screw 49 through which the movable stop cam 48 can be locked in any position and prevented from rotating relative to the fixed stop cam 47. The tubular housing 1 has an opening 50 adjacent the stop cams 48 and 47 arranged on the orbit gear 29. A counterstop device is connected to the outer periphery of the housing 1. This counterstop device consists of a support 51 into which there is fitted a bolt 52. Connected to the cylindrical portion of this bolt 52 there is a counterstop cam 53 which extends through the opening 50 in the tubular housing 1 and with whose sides the corresponding radial portions of the fixed stop cam 47 and of the movable stop cam 48 come into contact when the orbit gear 29 rotates. A return spring 54 which exerts on the orbit gear 29 a force acting tangentially in one direction is arranged between the ball bearing 35 and the ball bearing 17, between the inner periphery of the tubular housing 1 and the outer periphery of the recess 36 of the orbit gear 29.

The operation of the nut runner according to the invention is described in detail in the following with reference to a screwing operation.

Figure 2:
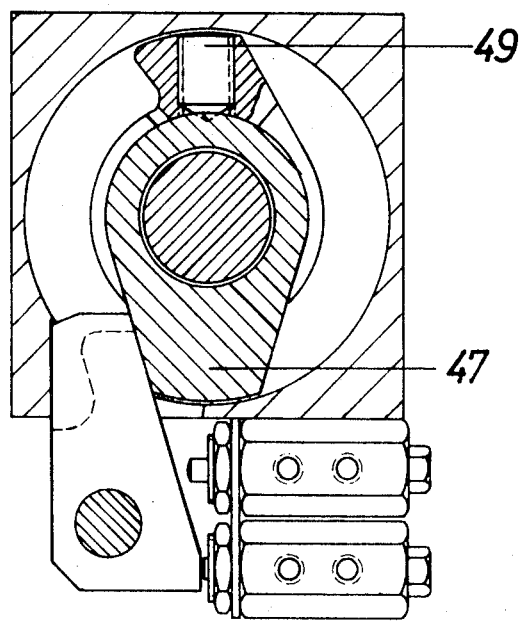
FIG. 2 is a section on the line I-I of FIG. 1 as seen from above.
Figure 3:
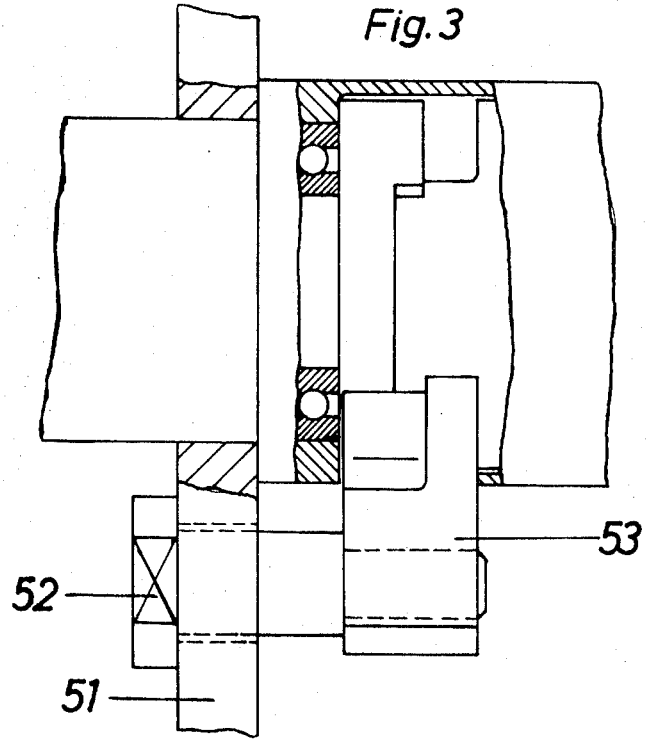
FIG. 3 is a portion cut out around the line I-I.

After a nut for example has been brought into contact with the nut runner, the motor 4 is acted upon by a certain air pressure which is sufficient to move the nut until it comes to rest on the surface of a workpiece and to tighten it to a certain adjustable pretorque. If the fastener to be tightened has a right-hand thread, the driving motor 4 rotates clockwise in this first stage of movement. The driving shaft section 19 is rotated clockwise and the overrunning clutch 45 situated between the driving shaft 19 and the axially countersunk bore 40 locks and thus takes the driven shaft 20 and the tool mounting shaft 14 with it in clockwise rotation. When the nut has made contact, a torque is built up, stopping the motor 4 and hence the nut runner providing it is equal to the torque of the driving motor 4. At this moment, the driving motor 4 is switched from clockwise rotation to anticlockwise rotation. The overrunning clutch 45 which, during clockwise rotation of the motor, directly connected the driving shaft section 19 and the driven shaft section 20 together, is released. When the driving shaft section 19 rotates anticlockwise the overrunning brake 44 applies the planet gear cage 25 against the stepped bushing 7 and by virtue of the inner teeth of the orbit gear 29 the orbit gear 29 is driven by the driving shaft section 19 in the same direction of rotation as the planet gear 28. The overrunning clutch 45 which is active during clockwise rotation of the driving motor 4 is inactive during anticlockwise rotation of the driving motor 4 the rotational movement is now transmitted through the orbit gear 29 to the driven shaft section 20. To this end, the overrunning clutch 46 actuated through the orbit gear 29 on the outer periphery of the step 37 locks and drives the driven shaft section 20 and hence the tool mounting shaft 14 in the same direction as the orbit gear so that when the driving motor 4 rotates anticlockwise the tightening rotation is continued in clockwise rotation. When the orbit gear rotates clockwise the fixed stop cam 47 and the movable stop cam 48 are moved by the orbit gear 29 until one side of the counterstop cam 52, thus generating a moment which is greater than the driving torque of the motor 4 amplified through the planetary gear-drive so that the runner comes to a stop on reaching a precisely determinable angle of rotation. The precise angle of rotation through which the orbit gear 29 can pass during clockwise rotation is determined by the relative adjustment of the movable stop cam 48 to the fixed stop cam 47. The angle between the movable stop cam 48 and the fixed stop cam 47, subtracted from 360° C., gives the angle through which the orbit gear can pass in clockwise rotation. The return spring 54 presses one side of the movable stop cam 48 against the counterstop 53 in anticlockwise direction so that there is always adjusted a zero position from which the orbit gear 29 can move to produce a precise angle of rotation. As shown in FIG. 2, this angle of rotation increases when the movable stop 48 is moved towards the fixed stop cam 47 connected with the orbit gear 29. This increase in the angle is obtained by virtue of the fact that the return spring presses the orbit gear back by an amount identical with that by which the angle between the two cams 47 and 48 was reduced. When the two cams 47 and 48 are situated one above the other, the fixed cam moves through 360° C. less the wall thickness of the counter stop cam 53. To make the nut runner easier to handle, the driving shaft section 19 is in two parts. The driving shaft section comprises a front section 55 located coaxially by a pin 56. The facing ends of the sections carry jaw-clutch halves 57, 58 through which the two shaft sections engage with one another. The jaws of jaw-clutch halves 57, 58 have an angular clearance between them, whereby the left clutch half 57 may, together with clutch element 45, rotate backwards relative to clutch element 46 under the load of the return spring 54 so as to permit return of the movable stop cam 48 towards the zero position, with the result that the torsional strain between the tool secured to the shaft 14 and the tightened threaded fastener is eliminated after the driving motor 4 has been switched off. In the nut runner according to the invention, the clutches are in the form of overrunning clutches although it is also possible to use other couplings. In addition, it is possible to use an intermediate gear instead of a planetary gear train. Furthermore, the roller bearings may be replaced by plain bearings.

The provision of a planetary gear makes the nut runner very easy to use. It is an advantage that a mass-produced and hence inexpensive power-vane motor can be used for the nut runner. The disadvantages arising out of the fact that a power-vane motor has to be acted upon by working media under different initial pressure in order first to pretighten the screw joint with a relatively small torque and then with a torque several times greater by the angle-of-rotation method are avoided in the nut runner according to the invention.

In one direction of rotation, it is fed with the normal operating pressure associated with the pretightening torque, so that this pressure can be regulated in known manner. The increase in the torque to a multiple thereof during tightening is achieved by appropriately selecting the gear ratio of the planetary gear which is only operational during anticlockwise rotation of the driving motor.

In this way, a limited amount of time only is required for screwing on the screw elements until they are in contact with the surface of the workpiece, and for tightening them, which is not possible with conventional nut runners since in their case the considerable difference between the pretightening torque and the full-tightening torque were adjusted by the difference in the working pressures of the driving medium, resulting in a very low operating pressure and hence in a low speed of rotation of the driving motor during pretightening. In cases where the nut runner is used in a series, it is also possible to dispense with the equilibrium torque which effects reversal, and instead of this possibility to reverse all the tools after a certain predetermined time interval without in any way affecting the constantly recurring high accuracy of the pretensioning force governed by the angle of rotation. In addition, the working medium can be measured in such a way that all factors of influence changing from one screw connection to another are safely taken into consideration, without any danger of the excess torque moving the pretensioning force beyond the maximum acceptable tolerance should these influencing factors require a minimal residual adjusting moment. Adjustment to the mechanicaletechnological properties and to the geometric dimensions of the nuts and screws can readily be effected in the rotary piston motor without any appreciable reduction in the short tightening times that can be achieved with the nut runner according to the invention. By virtue of the fact that an input torque in the nut runner is amplified by a gear with transmission ratios of from 3 to 5:1, and the angle of rotation is limited by a stop cam fixedly connected to the orbit gear the nut runner is unaffected by influencing factors emanating both from the parts to be screwed and from fluctuations in the supply of air, so that it is possible with the nut runner according to the invention to produce tension loads that are governed by the angle of rotation and on all sides lie very safely within close tolerance limits.

Another advantage of the nut runner according to the invention is that very appreciable torques are obtained when the screws are tightened by the angle-of-rotation method with a relatively small driving motor by virtue of the planetary gear, so that during tightening the amount of air to be fed to the motor is considerably smaller than it is in conventional nut runners. This factor is of particular importance in cases where a plurality of nut runners operate in conjunction with one another in a machine and the cross sections of the feed lines have to be made large corresponding to the air feed rate, thus making the multispindle nut runner difficult to handle.

What I claim is:

1. A nut runner comprising:
   a reversible drive motor and a housing mounted to said motor;
   a driving shaft section rotatably supported within said housing, and adapted to be driven from said motor in forward and reverse directions;
   a driven shaft section rotatably supported within said housing and drivably connected with a work engaging tool;
   coupling means for driving said driven shaft section from said driving shaft section in one direction during rotation of the driving shaft section in both said forward and reverse directions, and
   rotation-limiting means, adapted to terminate rotation of the driven shaft after a predetermined angular movement of said driving shaft in said reverse direction.

2. A nut runner as claimed in claim 1, wherein said rotation-limiting means comprises rotary stop means adapted to be rotated during said reverse rotation, and to cooperate with counterstop means fast with said housing.

3. A nut runner as claimed in claim 1, wherein said coupling means includes planetary gear train comprising a pinion mounted on said driving shaft section, an internally toothed tubular orbit gear rotatable within the housing, at least one planet gear meshing with said pinion and tubular orbit gear, and a rotatable planet gear cage mounting said planet gear.

4. A nut runner as claimed in claim 3, wherein said coupling means further comprises first locking means adapted to hold said planet gear cage stationary during rotation of said driving shaft section in said reverse direction, and to release said planet gear cage during rotation in said forward direction.

5. A nut runner as claimed in claim 1, wherein said coupling means includes second locking means between said shaft sections, and adapted to rotatably connect said shaft sections during rotation of said driving shaft section in said forward direction and to disconnect said shaft sections during rotation of said driving shaft section in the reverse direction.

6. A nut runner as claimed in claim 4, wherein said coupling means includes third locking means drivably connecting the tubular orbit gear and the driven shaft during rotation of the tubular orbit gear caused by rotation of the driving shaft in the reverse direction.

7. A nut runner as claimed in claim 6, wherein said tubular orbit gear mounts stop means adapted to cooperate with a counterstop carried on the housing to thereby block movement of the tubular orbit gear after predetermined angular movement thereof.

8. A nut runner as claimed in claim 7, wherein the stop means includes a fixed stop member and an angularly adjustable to stop member, thereby providing for adjustment of said predetermined angular movement.

9. A nut runner as claimed in claim 8, further including a return spring connecting the tubular orbit gear and the housing.

10. A nut runner as claimed in claim 1, wherein the first shaft section is in two parts which engage via a pin and jaw coupling.

11. A nut runner comprising; a reversible motor; a housing mounted to said motor; coaxial driving and driven shaft sections supported rotatably in the housing, said driving shaft section being drivably connected with the the motor, and the driven shaft section being drivingly connected with the tool; a first releasably driving means for directly connecting the shaft sections for rotation together in one direction in response to rotation of the driving shaft section in said direction, and having response to rotation of the driving shaft section in a reverse direction to release said direct connection; a second releasable driving means having response to reverse rotation of the driving shaft section for interconnecting the driving shaft section with the driven shaft section so as to continue the rotation of the driven shaft section in said one direction, an adjustable stop mechanism having response to reverse rotation of the driving shaft section to limit the angle of rotation of the driven shaft section.

UNITED STATES PATENT OFFICE
CERTIFICATE OF CORRECTION

Patent No. 3,589,489　　　　Dated June 29, 1971

Inventor(s) Herbert Fehlings

It is certified that error appears in the above-identified patent and that said Letters Patent are hereby corrected as shown below:

Column 1, line 3, "to nut runner" should read -- to a nut runner --; line 5, "and housing" should read -- and a housing --. Column 2, line 69, "ends" should read -- end --. Column 3, line 72, "fixed stop cam comes into contact with one side of the" should be added after "orbit gear 29 until one side of the". Column 5, line 2, "mechanicaletechnological" should read -- mechanical-technological --. Column 6, line 26, "to" should be canceled.

Signed and sealed this 16th day of May 1972.

(SEAL)
Attest:

EDWARD M. FLETCHER, JR.
Attesting Officer

ROBERT GOTTSCHALK
Commissioner of Patents